United States Patent [19]

Kobayashi et al.

[11] Patent Number: 4,988,013
[45] Date of Patent: Jan. 29, 1991

[54] CONTAINER LID STRUCTURE AND METHOD FOR MANUFACTURING THE SAME

[75] Inventors: Yukio Kobayashi; Hitoshi Sasaki; Shoji Igota, all of Kawasaki, Japan

[73] Assignee: Ajinomoto Company, Inc., Tokyo, Japan

[21] Appl. No.: 288,559

[22] Filed: Dec. 22, 1988

[30] Foreign Application Priority Data

Dec. 22, 1987 [JP] Japan ............... 62-322889
Oct. 13, 1988 [JP] Japan ............... 63-258323

[51] Int. Cl.$^5$ .................................. B65D 17/40
[52] U.S. Cl. ..................... 220/276; 220/270; 220/272; 220/359
[58] Field of Search ............. 220/269, 270, 271, 272, 220/273, 276, 359

[56] References Cited

U.S. PATENT DOCUMENTS

| | | | |
|---|---|---|---|
| 3,499,573 | 3/1970 | Adams | 220/271 |
| 3,833,144 | 9/1974 | Bollmann et al. | 220/272 X |
| 3,884,342 | 5/1975 | Ball | 220/272 |
| 4,155,481 | 5/1979 | Takahashi et al. | 220/270 |
| 4,165,016 | 8/1979 | Moller | 220/270 |
| 4,212,409 | 7/1980 | Jeppsson | 220/276 |
| 4,234,099 | 11/1980 | Tarro | 220/269 |
| 4,309,952 | 1/1982 | Takahashi et al. | 413/12 |
| 4,408,697 | 10/1983 | Yoshikawa et al. | 220/270 X |
| 4,448,324 | 5/1984 | Jeppsson et al. | 220/276 X |
| 4,501,375 | 2/1985 | Katsura et al. | 220/270 |
| 4,513,876 | 4/1985 | Buchner | 220/270 |
| 4,572,393 | 2/1986 | Kobayashi et al. | 220/270 |
| 4,735,336 | 4/1988 | Buchner et al. | 220/270 |
| 4,784,284 | 11/1988 | Miyanchi et al. | 220/270 |

*Primary Examiner*—Stephen Marcus
*Assistant Examiner*—Nova Stucker
*Attorney, Agent, or Firm*—Oblon, Spivak, McClelland, Maier & Neustadt

[57] ABSTRACT

A container lid structure made essentially of plastics. The lid structure includes a lid frame and a lid plate. The lid plate includes an inner layer comprising a metal foil coated at the opposite sides by plastic layers and connected at the peripheral portion with the lid frame and a core made of a material which is not adhesive to or has a weak bonding power with the plastic material for the lid frame and for the plastic layer of the inner layer. The core is laid over the inner layer with the peripheral portion in an abutting relationship with the inner periphery of the lid frame. A holding member is formed on the core and bonded to the inner layer through apertures in the core. A pulling tab is also formed on the core and bonded to the inner layer through an aperture in the core.

12 Claims, 5 Drawing Sheets

CONTAINER LID STRUCTURE AND METHOD FOR MANUFACTURING THE SAME

BACKGROUND OF THE INVENTION

1. Field of the Invention

The present invention relates to a container lid structure, and more particularly to a container lid structure provided with a lid opening tab. More specifically, the present invention pertains to a container lid structure which is totally or mostly made of plastic material.

2. Description of the Prior Art

A container lid structure having a finger gripping tab for opening the container has been widely adopted for example in a metal can. It has also been proposed for example by the Japanese patent laid-open application No. 57-163641, the Japanese patent publication No. 58-52897 and the Japanese patent laid-open application No. 59-31131 to provide a container lid structure having such a container opening tab with a plastic forming technique. The proposed container lid structure includes a lid frame adapted to be attached to a container barrel and a lid plate encircled by the lid frame, a score line being formed along a border between the lid plate and the lid frame to facilitate breakage in opening the lid. The score line is in the form of a groove formed on the upper surface of the lid structure.

The score line thus formed on the upper surface of the lid is of a groove configuration having a low strength so that it can cause a deformation in the lid frame in storage or transportation of the container when the container is subjected to a shock load by being dropped or hit to another article. In a worst case, the lid may be broken at the score line causing the content of the container to be discharged. It should be noted that such problems are apt to occur when the lid structure is made of a plastic material because the plastic material has a lower strength.

Since the score line is of a groove configuration exposed to the upper surface of the lid, it is likely that dust is accumulated in the groove during storage of the container providing an insanitary appearance and decreasing the commercial value. It should further be noted that due to the low strength there is a further problem in that the so-called tamper resist property, that is, the property which can prevent others from piercing an injection needle through the score line, may be lowered.

Another problem experienced in a conventional plastic lid structure is that the opening tab is formed by a process which is separate from the process for the manufacture of the lid plate and attached to the lid plate afterwards. In the conventional lid structure, the manufacturing process therefore includes an increased number of steps and difficulties have been experienced in trying to decrease the manufacturing cost.

SUMMARY OF THE INVENTION

It is therefore an object of the present invention to solve problems inherent in a lid structure in which the whole or a major part of the lid structure is made of a plastic material and a score line is formed on the upper surface of the lid for opening, the problems being that the lid structure is likely to be broken due to the decreased strength and dust is apt to be accumulated in the score groove to lower the commercial value.

A further object of the present invention is to provide a simple and less expensive manufacturing process for manufacturing from a plastic material a container lid structure having an opening tab.

In order to solve the aforementioned problems, the container lid structure in accordance with the present invention includes a lid plate and a lid frame adapted to encircle the lid plate and to be attached to an end of a container barrel, a tab being attached to the lid plate so that the lid plate can be removed from the lid frame by pulling the tab to form an opening The lid frame is arranged with respect to the lid plate so that the inner peripheral portion of the lid frame is in abutting relationship with the outer peripheral portion of the lid plate, the inner peripheral portion of the lid frame and the outer peripheral portion of the lid plate being formed of materials which are not adhesive to, or which have a weak bonding power with respect to, the material for the lid frame.

According to another aspect of the present invention, the lid plate includes an inner layer having a peripheral portion attached to the lid frame and a core member arranged along an outer surface of the inner layer and having an outer peripheral portion placed in an abutting relationship with respect to the inner peripheral portion of the lid frame, the outer peripheral portion of the core and the inner peripheral portion of the lid frame being made of materials which are not adhesive to, or which have a weak bonding power with respect to, the material for the lid frame. The tab is arranged along the upper surface of the core and has an end portion which is passed through the core and attached to the inner layer. According to a preferable aspect of the present invention, the inner layer is of a structure having a gas barrier property by including a metallic foil coated at the opposite sides with plastic coatings A holding member may be provided along the upper surface of the core of the lid plate and integrally with the end portion of the tab, the holding member being passed through the core and attached to the inner layer.

It should further be noted that in accordance with the lid structure of the present invention it is desirable to form the opening tab at a top surface of a portion adjacent to the end portion thereof with a transversely extending groove so that the force for opening the lid can be effectively transmitted.

According to the present invention, the process for manufacturing a container lid structure comprises steps of providing a film-like inner layer of which at least upper surface is made of a plastic material, locating on said inner layer a core made of a plastic material which is not adhesive or has a weak bonding power with respect to the plastic material from which the inner layer is made, the core being formed at a peripheral portion with an aperture for installation of a tab and aperture means for installation of a holding member, injecting a plastic material which is the same as, or has a good adhesive property to, the plastic material from which the inner layer is formed to an area around peripheral portions of the inner layer and the core as well as an area on the core covering the tab installation aperture and the holding member installation aperture means and an area where the tab is to be formed, whereby a lid frame is formed by the plastic material injected around the peripheral portions of the inner layer and the core. The holding member is formed by the plastic material injected to the area covering the tab installation aperture and the holding member installation aperture means and the tab are formed by the plastic material injected to the area where the tab is to be formed.

According to the lid structure of the present invention, the inner peripheral portion of the lid frame and the outer peripheral portion of the lid plate are in an abutting relationship. It is therefore possible to transmit any shock load applied to a corner portion of the lid from the lid frame to the lid plate through the abutting connection between the lid frame and the lid plate without producing any local deformation at the abutting connection It should further be noted that the lid structure is free from groove configuration formed between the lid frame and the lid plate so that it is possible to eliminate the problem that dust accumulates in the groove configuration.

In the lid structure in accordance with another aspect of the present invention, the lid plate is formed of a core and an inner layer and the inner layer is attached to the lid frame. It is therefore possible to provide a gas barrier property via the inner layer. The tab and the holding member are attached to the inner layer through the apertures in the core so that it is possible to hold the core on the inner layer even though the core is made of a material which is not adhesive to, or has a weak bonding power to, the material of the inner layer. In this lid structure, the lid is opened by breaking the inner layer at the abutting connection between the core and the lid frame. In the case where the tab is formed on the upper surface of the tip end portion with a transversely extending groove, the tab can readily be lifted when opening the lid and it is possible to use the shoulder of the groove as a fulcrum for a lever action to thereby concentrate the opening force readily to the peripheral portion of the lid plate. In this structure, the inner layer is not bonded to the core. It is therefore possible that the inner layer may be deflected inwardly separately from the core. In the case where the container is filled with a content which is under a high temperature, there will be produced a negative pressure in the container as the temperature goes down. However, it is possible to prevent the container barrel from being collapsed by forming the inner layer is deformed under the negative pressure. The inner layer may be of a type including a metallic foil. Then, it is possible to detect the deflection of the metallic foil by electromagnetic means to thereby detect the sealing condition between the lid and the container barrel.

In the process for manufacturing the container lid structure in accordance with the present invention, the holding member and the tab are made through the injection of a plastic material which is the same as, or can be readily bonded to the material for the lid frame and the inner layer so that the tab and the holding member are securely bonded to the inner layer through the apertures formed in the core. It will therefore be understood that in accordance with the present invention it is possible to readily produce a container lid having an opening tab by use of a plastic forming technology.

The above and other objects and features of the present invention will become apparent from the following descriptions of preferred embodiments taking reference to the accompanying drawings.

DESCRIPTION OF THE PREFERRED EMBODIMENT

Figure 1:
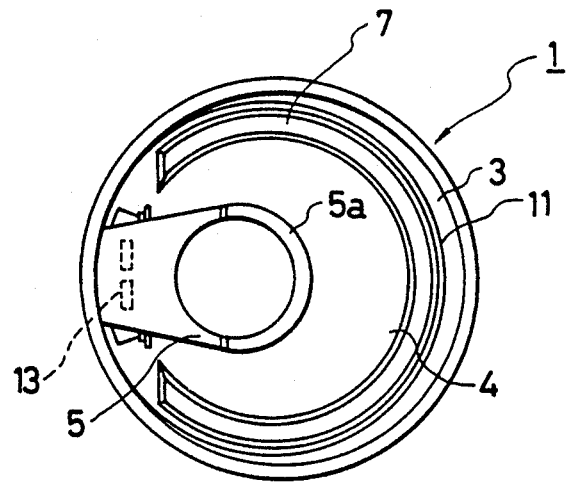
FIG. 1 is a plan view of a container lid structure in accordance with one embodiment of the present invention.
Figure 2:
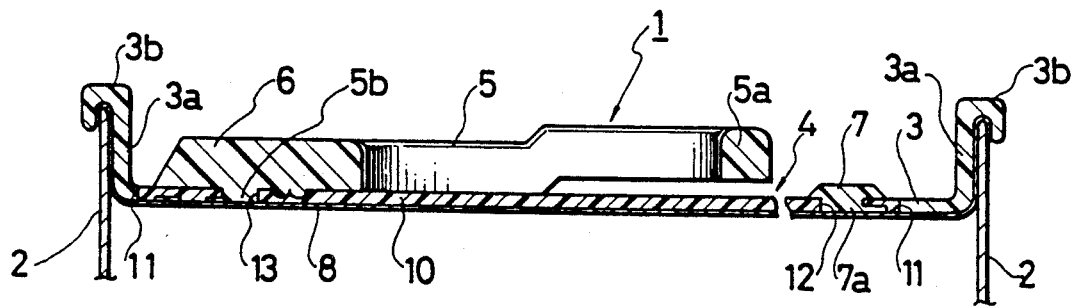
FIG. 2 is a sectional view of the lid structure in accordance with the embodiment shown in FIG. 1.

The embodiments of the present invention will now be described. Referring at first to FIGS. 1 and 2, there is shown a container lid structure 1 which is generally formed in a circular disc shape and includes a lid frame 3 constituting a peripheral structure and a lid plate 4 which is located inside the lid frame 3. The lid frame 3 has an outer peripheral portion formed with an upright cylindrical wall 3a which folded at an upper end in an inverted U-shape to provide a curled edge 3b. The curled edge 3b defines a groove and a container barrel is fitted at one end to the groove. The lid structure 1 and the barrel 2 are connected together by means of an appropriate means such as an ultrasonic welding, a high frequency welding or a heat sealing.

The lid plate 4 of the lid structure is adapted to be removed through an opening operation from the lid frame 3 to provide a container opening. For the opening operation, the lid plate is provided with a tab 5 which can be gripped by fingers. As shown in FIG. 2, the tab 5 is provided to extend along the upper surface of the lid plate 4 and has a tip end portion 6 adjacent to the outer periphery of the lid plate 4 to be attached to the lid plate 4. The tab 6 has a free end or a rear end opposite to the tip end portion 6 and a ring 5a as a pull portion is provided, at this free end for engagement with a finger. The lid structure 1 is opened by engaging a finger with the ring 5a of the tab and pulling the tab 5 upwardly.

Figure 3:
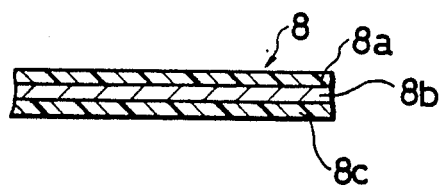
FIG. 3 is a sectional view of a laminate constituting the inner layer.

In the illustrated embodiment, the lid plate of the lid structure 1 comprises a laminate 8 providing an inner layer, i.e., a layer on an interior side of the container a core 10 and a holding member 7. The laminate 8 includes as shown in FIG. 3 a metallic foil 8b such as an aluminum foil and plastic layers 8a and 8c coating the opposite sides of the metallic foil 8b. The lid frame 3 is also made of a plastic material. For the plastic material for the lid frame 3, an appropriate one is chosen from materials which are the same as, or have a good bonding property with respect to, the plastic material for the plastic layer 8a. For the lid frame 3 and the laminate 8, use may for example be made of polypropylene. The core 10 is made of a plastic material which is, not adhesive to, or has a poor bonding power with respect to, the plastic material for the lid frame 3. It is possible to form the core 10 from a metallic material which is not adhesive to the plastic material for the lid frame 3.

The core 10 is arranged along the upper surface of the laminate 8 and has an outer peripheral portion located in an abutting relationship with respect to an inner peripheral portion of the lid frame 3 to provide an abutting portion 11. The tab 5 is bonded to the plastic layer 8a of the laminate 8 through a connecting leg 5b which is passed through an aperture 13 formed in the core 10 in the vicinity of the tip end portion 6. As shown in FIG. 1, the holding member 7 is of a ring shape and located along the peripheral portion of the core 10. The holding member 7 is bonded to the plastic layer 8a of the laminate 8 by means of connecting legs 7a which are passed through apertures 12 formed along the peripheral portion of the core 10. The tab 5 and the holding member 7 are made of a material which is not adhesive to, or has a poor bonding property with respect to the material of the core and which is the same as or has a good bonding power to the material for the plastic layer 8a of the laminate 8a. In the case where the core 10 is formed of a plastic material and the lid frame 3 and the plastic layer 8a of the laminate 8 are made of polypropylene, the core 10 may be made of a material selected from nylon, polyester, polycarbonate, ebonite, bakelite, epoxy, phenol resin, uria-resin, melamine resin, modified polyphenylene oxide, polysulphone and polyphenylene sulfide which have melting points which are higher than that of polypropylene, or filler materials such as glass fibers impregnated by those materials. In the case where the core 10 is made of a metallic material, an iron-based material or an aluminum based alloy may be used.

The tab 5 is located in the vicinity of the abutting portion 11 which is formed between the inner peripheral portion of the lid frame 3 and the outer peripheral portion of the core 10. In the opening operation, a finger is engaged with the ring 5a at the rear end portion of the tab 5 to pull the tab upward to thereby cause the tip end portion 6 of the tab 5 to be pushed down. Under this downwardly directed force, the core 10 is deformed inwardly as its peripheral portion separates from the lid frame. The laminate 8 is broken in the vicinity of the tip end portion of the tab 5. As the tab 5 is continued to be pulled up, the laminate 8 is broken along the entire periphery of the core 10 so that the container is opened.

Figure 4A:
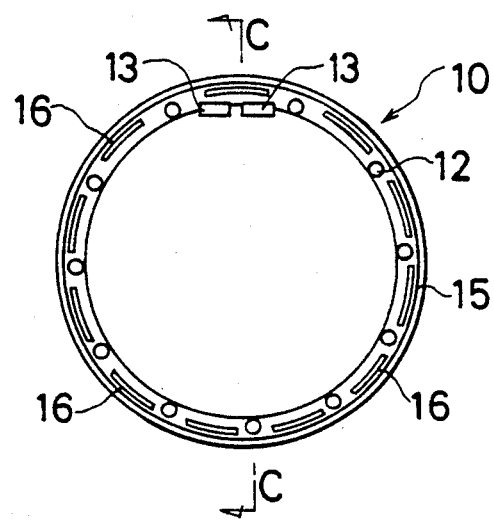
FIG. 4a is a bottom view of the core.
Figure 4B:
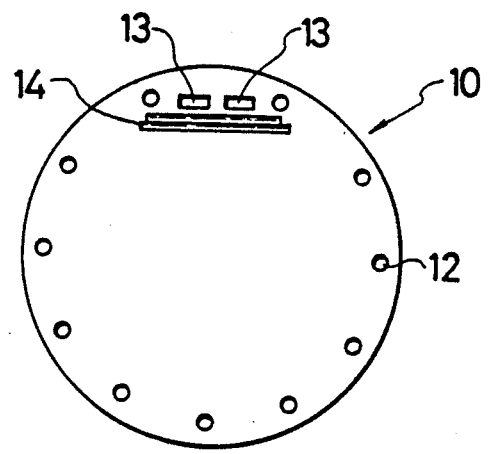
FIG. 4b is a plan view of the core.
Figure 4C:
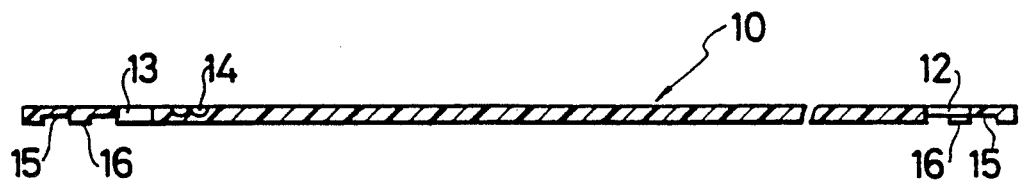
FIG. 4c is a sectional view of the core.
Figure 5A:
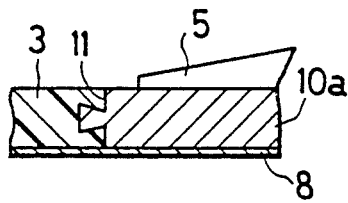
FIGS. 5 a, b, c, d, e and f are sectional views showing examples of connection between the tab and the lid plate.
Figure 5B:
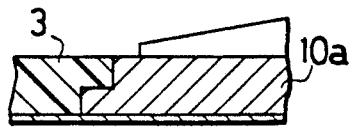
Figure 5C:
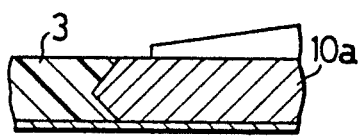
Figure 5D:
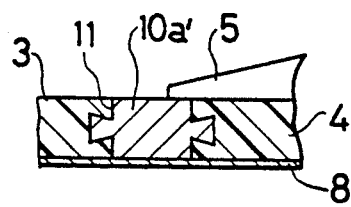
Figure 5E:
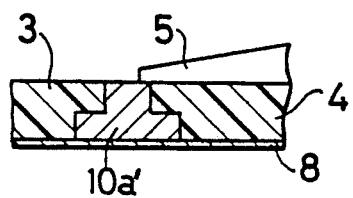
Figure 5F:
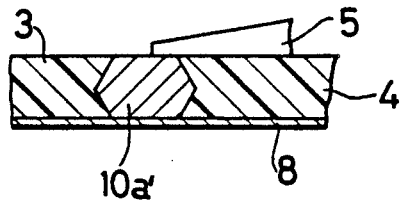

The lid structure 1 can readily be made of a plastic forming technique. In the forming process, a laminate 8 as shown in FIG. 3 is prepared as the inner layer. The laminate 8 may be of a configuration of a circular disc. A core 10 as shown in FIG. 4 is further prepared As shown in FIG. 4, the core 10 is of a configuration of a circular disc having a diameter smaller than the diameter of the laminate 8. The core 10 has a peripheral portion formed at circumferentially spaced portions with apertures 12 and at a portion where the tip end portion 6 of the tab 5 is located with an aperture 13 which is larger than the aperture 12. Further, as shown in FIGS. 4b and 4c, the core 10 is formed at the upper surface with two grooves 14. It should further be noted that the core 10 is formed at the peripheral portion of the lower surface with an annular groove 15 as shown in FIGS. 4a and 4c. Reinforcement ridges 16 are formed in the groove 15 with appropriate spacings.

The core 10 is placed over the laminate 8 and located in a mould to which molten plastic material is injected. Although not shown in the drawings, the mould has a cavity for forming the lid frame 3, the tab 5 and the holding member 7 so that the lid frame 3, the tab 5 and the holding member 7 are simultaneously formed. The plastic material forming the lid frame 3 is connected to the upper surface of the laminate 8 at the peripheral portion thereof. A portion of the plastic material for forming the tab 5 flows through the aperture 13 to the groove 15 at the back side of the core 10 to be bonded to the plastic layer 8a of the laminate 8. A portion of the plastic material for forming the holding member 7 flows through the apertures 12 to the groove 15 at the back side of the core 10 to be bonded to the plastic layer 8a of the laminate 8. Thus, there is formed a lid structure 1 wherein the lid frame 3, the lid plate 4 and the tab 5 are integrated. The tab 5 may be formed at a portion adjacent to the groove 14 with a reinforcement ridge. The configuration of the lid frame 3 and the lid plate 4 at the abutting portion 11 may be appropriately determined as shown in FIGS. 5a, 5b, 5c, 5d, 5e and 5f.

Figure 6:
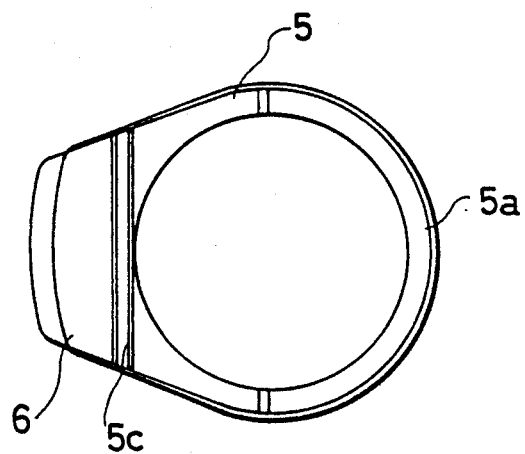
FIG. 6 is a plan view of the tab in accordance with another embodiment of the present invention.
Figure 7:
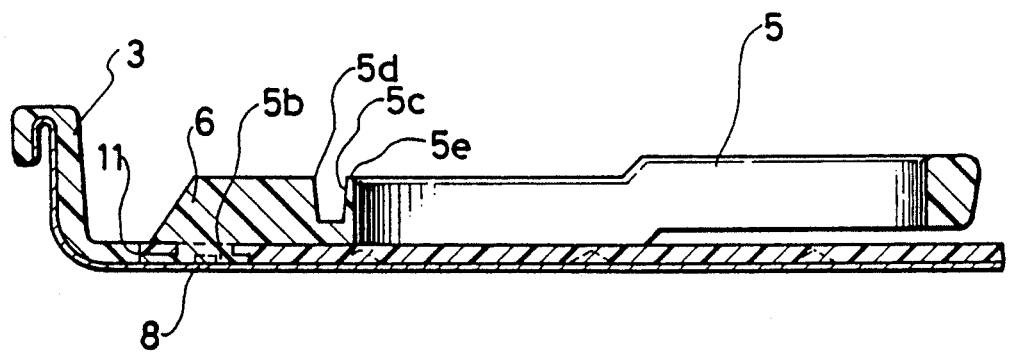
FIG. 7 is a sectional view of the embodiment shown in FIG. 6.

FIGS. 6 and 7 show another embodiment of the present invention. In this embodiment, the tab 5 is formed at the upper surface of a portion adjacent to the tip end portion with a transversely extending groove 5c. With the aid of the groove 5c, the tab 5 can be erected for the opening operation with a relatively small effort. In the opening operation, the shoulder portions 5d and 5e are engaged with each other and when the tab 5 is actuated further from this situation, the tip end portion 6 of the tab 5 is applied with a force which pushes the peripheral portion of the core 10 strongly downwardly. It is therefore possible to carry out the opening operation more easily.

Figure 8:
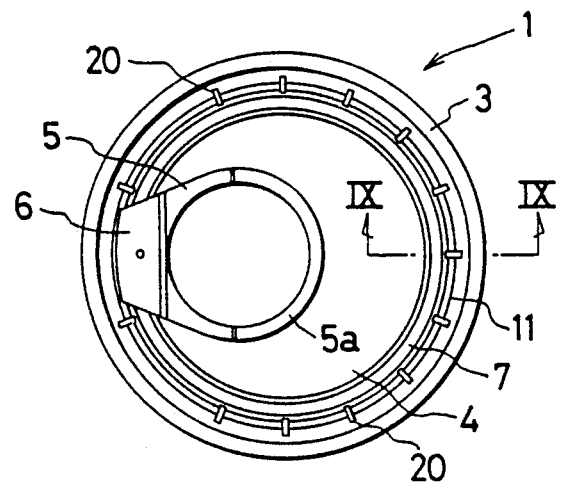
FIG. 8 is a plan view showing another embodiment of the present invention.
Figure 9:
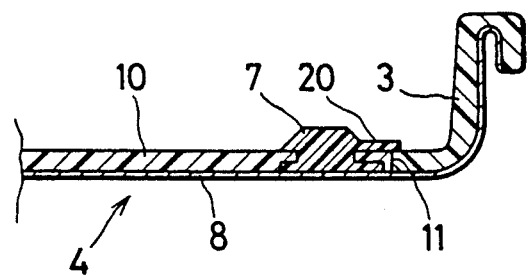
FIG. 9 is a sectional view taken along the line IX—IX in FIG. 8.

FIGS. 8 and 9 show a further embodiment of the present invention. In this embodiment, the holding member 7 is formed integrally with the tip end portion 6 of the tab 5 and has a plurality of circumferentially spaced bridge pieces 20 which extend radially outwardly toward the lid frame 3. The bridge pieces 20 extend as shown in FIG. 9 from the holding member 7 across the abutting portion 11 between the core 10 and the lid frame 3 over the upper surface of the lid frame 3. According to this embodiment, the bridge pieces 20 thus formed serve to prevent the lid plate 4 from being pushed inwardly under an external shock load which may be applied to the lid during transportation possibly causing failure of the lid.

Figure 10:
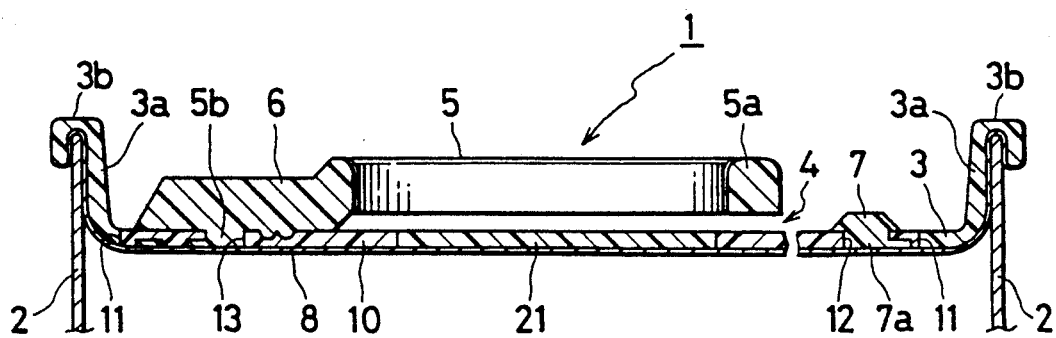
FIG. 10 is a sectional view showing a further embodiment of the present invention.

FIG. 10 shows a further embodiment of the present invention. In this embodiment, the core 10 is not of a circular disc shape but of a ring shape. Radially inside the ring forming the core 10, there is formed a disc 21 made of a plastic material which is the same as the material for the tab 5.

Results of comparative tests on lid structures in accordance with embodiments of the present invention and conventional lid structures having score lines will now be described.

Comparative Test (drop test)

Tests were conducted with the following sample lids.
The lid structure embodying the present invention included a laminate 8 comprising 70 μm of polypropylene film constituting the plastic layer 8c, 30 μm of aluminum foil constituting the metallic foil 8b and 50 μm of polypropylene film constituting the plastic layer 8a. The laminate 8 was placed in a mould. A core 10 of 0.65 mm thick was separately prepared from nylon resin containing 30% of glass fibers and laid over the laminate 8. Then, polypropylene resin was injected into the mould to produce a lid structure of 0.8 mm thick.

Comparative test samples were prepared using laminates which are the same as the laminate for the lid structure embodying the present invention The laminate was placed in a mould and polypropylene resin was injected into the mould to produce a lid structure having a score line of 1.0 mm wide and 0.65 mm deep along the entire periphery of the lid plate.

Each of the test samples was attached to a container barrel of 65 mm in inner diameter and 105 mm high which was filled with 300 ml of water. The container was sealed by attaching the lid structure to the barrel with a high frequency welding. The container was then subjected to a retort sterilization treatment under a temperature of 1250° C. for 30 minutes to prepare a specimen for a drop test. The specimens were subjected to drop tests from various heights to observe damages. The results are shown in Table 1.

TABLE 1

| Drop Height (cm) | Invention | Prior Art |
| --- | --- | --- |
| 50 | 0 | 0 |
| 60 | 0 | 2 |
| 70 | 0 | 4 |
| 80 | 0 | 8 |
| 90 | 2 | 8 |
| 100 | 5 | 10 |
| 110 | 8 | 9 |
| 120 | 9 | 10 |

The value in the table shows the number of test specimen which the lids were broken as the results of the drop tests, 10 specimens having been put into each test.

In Table 1, it will be noted that in the specimens embodying the present invention failure of the lid structure is seen at the drop height not smaller than 90 cm. To the contrary, in the comparative specimen, failure is seen even at the drop height of 60 cm. Thus, the lid structure embodying the present invention has a higher drop strength.

Comparative Test (Opening Tests)

Specimens prepared as in the previous tests were subjected to opening tests by a 12 person panel It was the feeling of the pane that the lid structure in accordance with the present invention comparative to conventional lid structure in respect of easiness of opening. In other words, the lid structure of the present invention has an openability which is equivalent to that in a conventional lid structure having a score line.

As described above, in the lid structure in accordance with the present invention, the inner peripheral portion of the lid frame and the outer peripheral portion of the lid plate are laid in an abutting relationship. It will therefore be understood that any shock load which may be applied to the container in storage or transportation will be transmitted from the lid frame through the abutting portion to the lid plate. Thus, it will not be likely as in a conventional structure having a score line that a local deformation is produced in the area of the score line. It should further be noted that since any groove such as a score line is not externally exposed, it is possible to avoid the problem that dust, is accumulated in the groove. Further, according to the present invention, it is possible to perform a plastic forming with a small number of steps.

The invention has thus been shown and described with reference to specific embodiments, however, it should be noted that the invention is in no way limited to the details of the illustrated structures but changes and modifications may be made without departing from the scope of the appended claims.

We claim:

1. A container lid structure comprising:
   a lid frame adapted to be attached to an end of a container barrel, said lid frame having an inner peripheral portion;
   a lid plate comprising an inner layer attached to the lid frame and an outer core arranged with respect to said lid frame such that an outer peripheral portion of said outer core is in abutting relationship with the inner peripheral portion of said lid frame, said lid frame and said lid plate being formed of materials which are substantially non-bonding with respect to one another; and
   a tab having a portion mounted to said outer core of said lid plate and a pull portion, said tab being mounted to said lid plate on an outer side thereof such that an edge of said tab presses down the lid plate to deform the outer peripheral portion of said lid plate toward said interior side when said pull portion is pulled,
   wherein said abutting relationship defines a weakened portion which breaks to permit the outer peripheral portion of the lid plate to separate from the inner peripheral portion of the lid frame and deform toward said interior side to pierce said inner layer and form an opening in the lid structure in response to said pull portion being pulled.

2. A container lid structure in accordance with claim 1 which includes a holding member arranged along said upper surface of said core in said lid plate, said holding member being passed through said core and bonded to said inner layer.

3. A container lid structure in accordance with claim 2 in which said holding member is formed integrally with an end portion of said tab.

4. A container lid structure in accordance with claim 2 in which said holding member and said tab are made of a material which has a good bonding property with respect to a material for a surface of said inner layer adjacent to said core.

5. A container lid structure in accordance with claim 1 in which at least said inner peripheral portion of said lid frame and said outer peripheral portion of said lid plate are formed by plastic materials.

6. A container lid structure in accordance with claim 1 in which at least said inner peripheral portion and said outer peripheral portion of said core are formed by plastic materials.

7. A container lid structure in accordance with claim 1 in which said tab is formed at an upper surface in the vicinity of an end portion of said tab with laterally extending groove means.

8. A container lid structure in accordance with claim 1 in which said core is of a circular disc shape.

9. A container lid structure in accordance with claim 1 in which said core is of a ring shape.

10. A container lid structure in accordance with claim 1 in which said lid frame is made of a plastic material at least at the inner peripheral portion, said core being made of a metallic material.

11. A container lid structure in accordance with claim 1 in which said inner layer includes a metallic foil coated at the opposite sides with plastic.

12. A container lid structure in accordance with claim 1 in which a plurality of circumferentially spaced bridge pieces are provided integrally with an upper surface of said core to extend from said core toward and over said lid frame.

* * * * *